: 2,700,679

CATALYTIC PROCESS FOR PREPARING CARBOXYLIC ACID CHLORIDES FROM THEIR CORRESPONDING ACIDS AND AN ALKYL POLYCHLORIDE

James E. Carnahan, New Castle, and Julian W. Hill, Wilmington, Del., assignors to E. I. du Pont de Nemours and Company, Wilmington, Del., a corporation of Delaware No Drawing. Application December 12, 1951, Serial No. 261,364

16 Claims. (Cl. 260—544)

This invention relates to a novel and improved method for preparing acid chlorides, and more particularly to a novel catalytic method for preparing carboxylic acid chlorides.

Technically, acid chlorides are obtained by the action of phosphorus pentachloride, phosphorus trichloride, thionyl chloride, or sulfuryl chloride on the corresponding acids. Although these methods produce the desired acid chloride, they are not entirely satisfactory because they employ easily hydrolyzable acid chlorides and therefore require operation under conditions which rigorously exclude the presence of moisture. Continued research directed to the development of alternative procedures has led to the replacement of the above acid chlorides with carbon tetrachloride, but this method employs an acid anhydride, which is also susceptible to hydrolysis, zinc chloride as the catalyst and temperatures ranging from 250–280° C. The need for finding other and simpler routes to acid chlorides still exists.

It is an object of this invention to provide a novel process for preparing carboxylic acid chlorides. A further object is to provide a new catalytic method for preparing carboxylic acid chlorides. Another object is to provide a method for preparing carboxylic acid chlorides directly from the corresponding carboxylic acids. Other objects will appear hereinafter.

The objects of this invention are accomplished by the following process for preparing carboxylic acid chlorides which comprises heating a carboxylic acid with an alkyl polychloride at a temperature in the range of 100° to 300° C. and in contact with a catalyst which contains molybdenum, tungsten, silicon, or aluminum as oxides, or as mixed oxides, or which is a metal salt of an acid of the formula $H_2MO_n$, in which $n$ is 2 or 3 and M is molybdenum or tungsten.

In a preferred embodiment, a 1:1 mole mixture of alkyl polychloride and carboxylic acid is contacted at 100° to 300° C. with a catalyst which contains as the essential catalytic component an oxide, or mixture of oxides of molybdenum or tungsten, or which is a metal salt of an acid of the formula $H_2MO_n$, in which $n$ and M have the previously indicated meanings, and then separating the acid chloride formed from the reaction mixture.

The examples which follow are submitted to illustrate and not to limit this invention.

Example I

Acetic acid (60 g., 1 mole), carbon tetrachloride (154 g., 1 mole), and 10 g. of a copper tungstite catalyst, prepared as described subsequently, were mixed and heated for 5 hours at 200° C. under autogenous pressure. Distillation of the reaction product yielded acetyl chloride, boiling point 50–54° C. in 15 percent conversion. Identification of the acetyl chloride was completed by infrared spectral analysis.

Example II

Acetic acid (60 g., 1 mole), carbon tetrachloride (154 g., 1 mole), and 10 g. of a nickel tungstite catalyst, prepared as described subsequently, were mixed and heated for 5 hours at 200° C. under autogenous pressure. Acetyl chloride, boiling point 50–54° C., was isolated from the reaction product in 11 percent conversion. Infrared spectral analysis confirmed the identity of the product.

Example III

Acetic acid (60 g., 1 mole), carbon tetrachloride (154 g., 1 mole), and 10 g. of a copper molybdite catalyst, prepared as described subsequently, were mixed and heated for 5 hours at 200° C. under autogenous pressure. Acetyl chloride was isolated and identified as in Examples I and II.

Example IV

Acetic acid (60 g., 1 mole), carbon tetrachloride (154 g., 1 mole), and 10 g. of a nickel molybdite catalyst, prepared as described subsequently, were mixed and heated at 200° C. for 5 hours under autogenous pressure. Acetyl chloride was isolated and identified as in Examples I and II.

Example V

Acetic acid (60 g., 1 mole), carbon tetrachloride (154 g., 1 mole), and 10 g. of a 10:90 alumina-silica catalyst were mixed and heated at 200° C. for 5 hours under autogenous pressure. Acetyl chloride was isolated and identified as in Examples I and II.

Example VI

Benzoic acid (122 g., 1 mole), carbon tetrachloride (154 g., 1 mole), and 10 grams of the copper tungstite catalyst of Example I were mixed and heated at 200° C. for 5 hours under autogenous pressure. Distillation of the reaction product yielded benzoyl chloride in 61 percent conversion and terephthalyl chloride in 18 percent conversion. Benzoyl chloride, boiling point 190–196° C., was identified by infrared spectral analysis, and terephthalyl chloride, boiling point 126–128° C./8 mm.; melting point, 54–60° C., was identified by conversion into dimethyl terephthalate and comparison with an authentic sample of dimethyl terephthalate by the mixed-melting point technique. Both the authentic material and the mixture melted at 142° C.

Example VII

Benzoic acid (122 g., 1 mole), carbon tetrachloride (154 g., 1 mole), and 10 g. of tungsten oxide, prepared by heating tungsten trioxide in hydrogen at 500° C. for 15 hours, were mixed and heated at 200° C. for 5 hours under autogenous pressure. Distillation of the reaction product yielded benzoyl chloride in 68 percent conversion and terephthalyl chloride in 12 percent conversion. Identifications were made as described in Example VI.

Example VIII

Benzoic acid (122 g., 1 mole), carbon tetrachloride (154 g., 1 mole), and 10 g. of molybdenum trioxide, prepared by dehydrating molybdic acid at 400° C., were mixed and heated at 200° C. for 5 hours under autogenous pressure. Distillation of the reaction product yielded benzoyl chloride (32% conversion), the identity of which was confirmed by infrared spectral analysis.

The above examples are illustrative of preferred embodiments of this invention and not limitations thereof.

The process of this invention can be conducted as a batch operation or continuously in the vapor or liquid phase.

The particular temperature employed depends upon the mode of operation, i. e., whether batchwise or continuously, liquid, or vapor phase. Irrespective of the method, good results are obtained within the range of 100° to 300° C. Better results from the standpoint of yield of desired products and utilization of reactants are realized in the range of 175 to 250° C. and this embraces the preferred operating temperature conditions.

Pressure is not a critical variable. The process is generally operated under autogenous pressure in a closed reactor, or under externally applied pressure, or at atmospheric pressure. Operation under autogenous pressure is preferred when the process is carried out batch-wise because the equipment requirements are simpler and manipulative problems are minimized.

The mole ratio of alkyl polychloride to acid should preferably be at least 1:1. If desired, mole ratios outside this range can be used.

Generally, the process is operated without any added solvent. In some cases the use of a solvent is desirable either to bring about better contact between the reactants or to function as a heat-dissipating medium. Suitable solvents are hydrocarbons such as cyclohexane, methylcyclohexane, octane, decane, etc. The alkyl polychloride can be used both as a reactant and as the reaction medium. The amount of solvent should be the minimum required to bring about the desired result.

The time of reaction depends upon the conditions employed and upon the nature of the reactants. As a rule, from 2 to 10 hours will be adequate. However, since prolongation of the reaction beyond the time required to bring about the desired result adds to costs, it is to be avoided. Usually the reaction is permitted to proceed for at least 2 hours because a lesser time is insufficient to bring about complete reaction even under the most favorable conditions. Ten hours represents an upper time limit because the amount of reaction occurring beyond this point is insufficient to compensate for the added labor and equipment costs.

As previously indicated, the catalysts used in the practice of this invention are those which contain molybdenum, tungsten, silicon, or aluminum as oxides or as mixed oxides, or which are metal salts of an acid of the general formula $H_2MO_n$ in which $n$ is 2 or 3 and M is tungsten or molybdenum.

One class of catalyst of the above kind are those containing molybdenum in chemical combination with oxygen and a metal, which itself or in the form of an oxide, is capable of promoting hydrogenation reactions, in which compounds the atomic ratio of oxygen to molybdenum is in the range of 2:1 to 3:1. Of these, the preferred compounds are the molybdites of metals whose ions are soluble in excess aqueous ammonia disclosed and claimed in U. S. Patent 2,572,300 issued to H. R. Arnold and J. E. Carnahan. These molybdites exist in two series, in the first the molybdenum is present in the quadrivalent state corresponding to the oxide $MoO_2$ and the hypothetic acid $M_2MoO_3$, and in the second the molybdenum is present in the bivalent state corresponding to the oxide MoO and the hypothetic acid $H_2MoO_2$. Examples of these molybdites are copper molybdite, $CuMoO_3$, and $CuMoO_2$, nickel molybdite, $NiMoO_2$, and cobalt molybdite, $CoMoO_2$ and $CoMoO_3$. These molybdites may contain promoters or modifiers, such as cadmium, barium, chromium, thorium, etc., if desired. These molybdites may be employed in the form of pellets, or as finely divided powders, and they may be used as such or extended on supports, such as charcoal, alumina, silica, etc. The preparation of nickel molybdite is described below:

A mixture of 145 grams of nickel nitrate hexahydrate, $Ni(NO_3)_2.6H_2O$, and 88 grams of ammonium heptamolybdate, $(NH_4)_6Mo_7O_{24}.4H_2O$, was heated for two hours at 280° C., then for an additional two hours at 500° C. The resulting solid, 108 grams, was pressed and sized into 8–14 mesh granules, after which it was reduced for 18 hours at 400° C. in a current of hydrogen at a rate of 1000 volumes of hydrogen per hour per volume (apparent) of catalyst. The reduced catalyst was found to contain approximately 31% of nickel, 52% of molybdenum and 17% of oxygen (by difference) closely corresponding to the formula $NiMoO_2$.

Another class of catalyst are the tungstites disclosed and claimed in the copending application of H. R. Arnold and J. E. Carnahan, U. S. Serial No. 208,662, filed January 30, 1951. These metal tungstites are metal salts of an acid having one of the formulas corresponding to $H_2WO_2$ and $H_2WO_3$. Generally these tungstites are obtained by reacting in the presence of excess ammonia, stoichiometric proportions of ammonium tungstate with a water-soluble salt of the metal whose tungstite is desired, washing the precipitate which forms, filtering it, drying it, and then calcining it for from 4 to 24 hours at 350° to 500° C. The calcined material, in granular or powdered form, is then reduced in a hydrogen containing atmosphere for from 5 to 100 hours at gradually increasing temperatures ranging from normal room temperature up to 550° C.

To prepare nickel tungstite, four moles of ammonium tungstate $[(NH_4)_2WO_4]$ in a 10% aqueous solution prepared by dissolving 1080 grams of ammonium paratungstate $[(NH_4)_6W_7O_{24}.6H_2O]$ in 7000 grams of water and 310 grams of 28% aqueous ammonia at 85° C., was added with stirring to 4 moles of nickel nitrate in a 16% solution, prepared by dissolving 1163 grams of $Ni(NO_3)_2.6H_2O$ in 6000 grams of water at 85° C. A pale green precipitate was formed in a slurry having a pH of approximately 6. The pH of the slurry was adjusted to 7 at 75° C. by addition of 404 parts of 28% aqueous ammonia. The resulting precipitate was washed, filtered, dried, and calcined at 400° C. The product thus obtained was charged into a furnace and heat-treated at 400° C. in a stream of nitrogen at a space velocity of 390 volumes of gas per volume of catalyst per hour for 12 hours, cooled at room temperautre in nitrogen, and the product then reduced for 24–47 hours at 450–480° C. in hydrogen at a space velocity of 600–1000 volumes of gas per volume of catalyst per hour. The reduced product corresponded by analysis to nickel tungstite $(NiWO_2)$ containing a slight excess of $W_2O_3$.

To prepare copper tungstite, an ammonium tungstate solution containing 2 moles of tungsten was prepared by dissolving 553 grams of ammonium metatungstate $[(NH_4)_2W_4O_{13}.7H_2O]$ in 3000 grams of water, and adding 182 grams of 28% aqueous ammonia to convert the ammonium metatungstate to normal ammonium tungstate $[(NH_4)_2WO_4]$. To this solution was added with stirring at room temperature a solution containing 2 moles of cupric nitrate prepared by dissolving 483.3 grams of $Cu(NO_3)_2.3H_2O$ in 3000 grams of water. A light-blue precipitate formed in a slurry having a pH of 4.6. The pH of the slurry was adjusted to 7.0 by addition of 110 grams of 28% aqueous ammonia. The resulting precipitate was washed, filtered, and dried at 120–130° C. The product was then reduced in a 3:1 nitrogen-hydrogen gas mixture at 400 space velocity for 32 hours starting at room temperature and increasing the temperature of reduction to 550° C. in 25 hours, holding the reduction temperature at 550° C. for 5 hours, and then cooling to room temperature, in hydrogen. The reduced product corresponded by analysis to copper tungstite $(CuWO_2)$.

The tungsten-containing catalysts are especially valuable when aromatic acids are concerned because they not only catalyze acid chloride formation from carboxyl groups already present in the molecule but they also bring about substitution reactions which place new carboxyl groups on the aromatic rings and yield polyacyl chlorides. Thus, when benzoic acid is caused to react with carbon tetrachloride in the presence of a tungsten oxide or copper tungstite catalyst there are obtained both benzoyl and terephthalyl chlorides. This novel synthesis is important because it makes it possible to obtain polybasic acids from monobasic acids. This synthesis is illustrated in Examples VI and VII.

The silica modified aluminas are the products obtained either by coprecipitating silica and alumina from aqueous solutions of their salts with ammonia or by adding alumina or silica to an aqueous solution of an aluminum or silicon salt, followed by precipitation with ammonia and drying or by simply mixing alumina and silica. Irrespective of their method of preparation, the ratio of alumina to silica in these compositions should be between 1 to 9 and 1 to 5.

The amount of catalyst employed depends on the method of operation selected. As a rule, however, it should be between 2 and 10% by weight of the reactants in a batch operation. In continuous vapor or liquid phase operation the amount of catalyst is considerably greater than the amount of material being processed at any one time. However, the total weight of material processed during the active life of the catalyst is at least ten times the catalyst weight.

Although in the examples certain specific acids have been used, it is to be understood that the process is widely applicable to aliphatic, including cycloaliphatic, monocarboxylic acids and to aromatic mono- and dicarboxylic acids. Thus, for illustration, there may be used such aliphatic carboxylic acids as acetic, propionic, butyric, lauric, tetradecanoic, octadecanoic, octenoic, linoleic, etc., such aromatic acids as benzoic, toluic, o-phthalic, terephthalic, naphthalic, etc., and such naphthenic acids as hexahydrobenzoic, etc. The preferred acids are those conforming to the general formula RCOOH in which R is an alkyl or aryl radical.

Any alkyl polychloride may be used in the practice of this invention and examples are chloroform, 1,2-dichloroethane, carbon tetrachloride, and the like. The preferred alkyl polychlorides are those containing from 1 to 2 carbon atoms in the alkyl group and two or less hydrogen atoms or hydrocarbon radicals on the chlorinated carbon atom.

The process of this invention makes possible the preparation of acid chlorides from the corresponding acids and alkyl polychlorides in good yields and with minimum of side reaction product formation.

As many apparently widely different embodiments of this invention may be made without departing from the spirit and scope thereof, it is to be understood that this invention is not limited to the specific embodiments thereof except as defined in the appended claims.

We claim:

1. A process for preparing carboxylic acid chlorides which comprises heating a carboxylic acid selected from the class consisting of aliphatic monocarboxylic acids up to 18 carbon atoms and mononuclear carbocyclic aromatic carboxylic acids containing 1 to 2 carboxyl groups with an alkyl polychloride containing 1 to 2 carbon atoms in the alkyl group at a temperature in the range of 100° to 300° C. and in contact with a catalyst selected from the class consisting of oxides and mixed oxides of molybdenum, tungsten, silicon and aluminum and metal salts of an acid having the formula $H_2MO_n$ wherein $n$ is an integer selected from the class consisting of 2 and 3 and M is a metal selected from the class consisting of molybdenum and tungsten.

2. A process for preparing carboxylic acid chlorides as set forth in claim 1 wherein said catalyst is a metal tungstite catalyst.

3. A process for preparing carboxylic acid chlorides as set forth in claim 1 wherein said catalyst is a molybdite of a metal whose ions are soluble in excess aqueous ammonia.

4. A process for preparing carboxylic acid chlorides as set forth in claim 1 wherein said catalyst is an alumina-silica catalyst.

5. A process for preparing carboxylic acid chlorides as set forth in claim 1 wherein said catalyst is a tungsten oxide catalyst.

6. A process for preparing carboxylic acid chlorides as set forth in claim 1 wherein said catalyst is a molybdenum trioxide catalyst.

7. A process for preparing carboxylic acid chlorides as set forth in claim 1 wherein said alkyl polychloride is carbon tetrachloride.

8. A process for preparing aromatic carboxylic acid chlorides which comprises heating a mononuclear carbocyclic aromatic carboxylic acid containing 1 to 2 carboxyl groups with an alkyl polychloride containing 1 to 2 carbon atoms in the alkyl group at a temperature in the range of 175° to 250° C. and in contact with a catalyst selected from the class consisting of oxides and mixed oxides of molybdenum, tungsten, silicon and aluminum and metal salts of an acid having the formula $H_2MO_n$ wherein $n$ is an integer selected from the class consisting of 2 and 3 and M is a metal selected from the class consisting of molybdenum and tungsten.

9. A process for preparing aromatic carboxylic acid chlorides as set forth in claim 8 wherein said alkyl polychloride is carbon tetrachloride.

10. A process for preparing aromatic carboxylic acid chlorides which comprises heating benzoic acid with an alkyl polychloride containing 1 to 2 carbon atoms in the alkyl group at a temperature in the range of 175° to 250° C. and in contact with a catalyst selected from the class consisting of oxides and mixed oxides of molybdenum, tungsten, silicon and aluminum and metal salts of an acid having the formula $H_2MO_n$ wherein $n$ is an integer selected from the class consisting of 2 and 3 and M is a metal selected from the class consisting of molybdenum and tungsten.

11. A process for preparing aromatic carboxylic acid chlorides as set forth in claim 10 wherein said alkyl polychloride is carbon tetrachloride.

12. A process for preparing aromatic carboxylic acid chlorides which comprises heating benzoic acid with carbon tetrachloride at a temperature in the range of 175° to 250° C. and in contact with a tungsten oxide catalyst.

13. A process for preparing aliphatic carboxylic acid chlorides which comprises heating an alkyl monocarboxylic acid of up to 18 carbon atoms with an alkyl polychloride containing 1 to 2 carbon atoms in the alkyl group at a temperature in the range of 175° to 250° C. and in contact with a catalyst selected from the class consisting of oxides and mixed oxides of molybdenum, tungsten, silicon and aluminum and metal salts of an acid having the formula $H_2MO_n$ wherein $n$ is an integer selected from the class consisting of 2 and 3 and M is a metal selected from the class consisting of molybdenum and tungsten.

14. A process for preparing aliphatic carboxylic acid chlorides as set forth in claim 13 wherein said alkyl polychloride is carbon tetrachloride.

15. A process for preparing acetyl chloride which comprises heating acetic acid with an alkyl polychloride containing 1 to 2 carbon atoms in the alkyl group at a temperature in the range of 175° to 250° C. and in contact with a catalyst selected from the class consisting of oxides and mixed oxides of molybdenum, tungsten, silicon and aluminum and metal salts of an acid having the formula $H_2MO_n$ wherein $n$ is an integer selected from the class consisting of 2 and 3 and M is a metal selected from the class consisting of molybdenum and tungsten.

16. A process for preparing acetyl chloride as set forth in claim 15 wherein said alkyl polychloride is carbon tetrachloride.

References Cited in the file of this patent

UNITED STATES PATENTS

| Number | Name | Date |
|---|---|---|
| 1,921,767 | Mills | Aug. 8, 1933 |
| 1,963,748 | Kyrides | June 19, 1934 |
| 1,963,749 | Kyrides | June 19, 1934 |
| 2,051,096 | Mares | Aug. 18, 1936 |
| 2,062,344 | Wiezevich et al. | Dec. 1, 1936 |
| 2,378,048 | Theobald | June 12, 1945 |

FOREIGN PATENTS

| Number | Country | Date |
|---|---|---|
| 293,924 | Great Britain | July 19, 1928 |